(12) United States Patent
Satoh et al.

(10) Patent No.: US 10,502,487 B2
(45) Date of Patent: *Dec. 10, 2019

(54) HEATING FURNACE AND CONTINUOUS HEATING FURNACE

(71) Applicants: Kimiyoshi Satoh, Tokyo (JP); Toshiyuki Suda, Tokyo (JP); Toshiro Fujimori, Tokyo (JP); Masao Aihara, Tokyo (JP)

(72) Inventors: Kimiyoshi Satoh, Tokyo (JP); Toshiyuki Suda, Tokyo (JP); Toshiro Fujimori, Tokyo (JP); Masao Aihara, Tokyo (JP)

(73) Assignee: IHI CORPORATION (JP)

( * ) Notice: Subject to any disclaimer, the term of this patent is extended or adjusted under 35 U.S.C. 154(b) by 660 days.

This patent is subject to a terminal disclaimer.

(21) Appl. No.: 14/183,962

(22) Filed: Feb. 19, 2014

(65) Prior Publication Data

US 2014/0170582 A1 Jun. 19, 2014

Related U.S. Application Data

(63) Continuation of application No. PCT/JP2012/071781, filed on Aug. 29, 2012.

(30) Foreign Application Priority Data

Sep. 5, 2011 (JP) ................................. 2011-192305

(51) Int. Cl.
*F27B 9/06* (2006.01)
*F27B 9/08* (2006.01)
(Continued)

(52) U.S. Cl.
CPC ............. *F27B 9/06* (2013.01); *F23D 14/125* (2013.01); *F27B 5/14* (2013.01); *F27B 9/08* (2013.01);
(Continued)

(58) Field of Classification Search
CPC ................. F27B 9/06; F27B 9/24; F27B 9/36
(Continued)

(56) References Cited

U.S. PATENT DOCUMENTS 2,045,773 A 6/1936 Havey ............................... 263/6
3,143,515 A 8/1964 Hurley ........................... 521/49
(Continued)

FOREIGN PATENT DOCUMENTS

CN 1346960 A 5/2002
CN 1467404 A 1/2004
(Continued)

OTHER PUBLICATIONS

Korean Office Action, dated Sep. 10, 2015, issued in corresponding Korean Patent Application No. 10-2014-7007286. English translation. Total 8 pages.

(Continued)

*Primary Examiner* — Avinash A Savani
*Assistant Examiner* — Rabeeul I Zuberi
(74) *Attorney, Agent, or Firm* — Ostrolenk Faber LLP

(57) ABSTRACT

A heating furnace includes a target space (212*a*) in which a burning target is disposed, and a furnace main body (212) that surrounds the target space. The heating furnace includes one or more closed gas heaters having an introduction hole configured to introduce a fuel gas into the main body, a combustion chamber in which the introduced fuel gas is combusted, a discharge section to which an exhaust gas generated by combustion is guided, a radiation surface heated by the exhaust gas flowing through the discharge section or combustion in the combustion chamber and configured to transfer radiant heat to the burning target, and an exhaust hole configured to exhaust the exhaust gas that heats the radiation surface to the outside of the main body, and disposed in the furnace main body, and an exhaust heat (Continued)

transfer section (an insulated pipe (222a)) in communication with the exhaust hole of the closed gas heater and to which the exhaust gas is guided. In addition, the exhaust heat transfer section is installed at any portion in the furnace main body except for a radiation space (212b) formed between the closed gas heater and the burning target disposed in the target space and configured to transfer the radiant heat to the burning target.

25 Claims, 16 Drawing Sheets

(51) Int. Cl.
F27B 9/36 (2006.01)
F27D 17/00 (2006.01)
F27B 9/10 (2006.01)
F27B 9/20 (2006.01)
F27D 99/00 (2010.01)
F23D 14/12 (2006.01)
F27B 5/14 (2006.01)
F27B 9/24 (2006.01)
A21B 1/10 (2006.01)
A21B 1/48 (2006.01)

(52) U.S. Cl.
CPC ............... F27B 9/10 (2013.01); F27B 9/20 (2013.01); F27B 9/36 (2013.01); F27D 17/00 (2013.01); F27D 17/004 (2013.01); F27D 99/0033 (2013.01); F27D 99/0035 (2013.01); A21B 1/10 (2013.01); A21B 1/48 (2013.01); F27B 9/24 (2013.01); F27D 2099/0061 (2013.01)

(58) Field of Classification Search
USPC ....... 432/147, 146, 121, 177, 144, 152, 175, 432/120, 239, 246, 244
See application file for complete search history.

(56) References Cited

U.S. PATENT DOCUMENTS

| | | | | |
|---|---|---|---|---|
| 3,216,489 | A | 11/1965 | Norton | 165/104.19 |
| 3,245,131 | A | 4/1966 | Kimble | 193/12 |
| 4,217,090 | A | 8/1980 | Whike et al. | 432/8 |
| 4,383,823 | A * | 5/1983 | Williams | A21B 1/48 432/148 |
| 4,493,308 | A | 1/1985 | Hurley et al. | 126/41 R |
| 4,529,123 | A * | 7/1985 | Johnson | F24D 5/08 126/92 AC |
| 4,553,526 | A * | 11/1985 | von Conta | F24B 1/026 110/213 |
| 4,651,814 | A * | 3/1987 | Ito | F24H 9/00 165/47 |
| 4,951,648 | A | 8/1990 | Shukla et al. | 126/21 A |
| 5,022,911 | A | 6/1991 | Balestra | 65/349 |
| 5,193,996 | A | 3/1993 | Mullen | 432/59 |
| 5,483,948 | A | 1/1996 | van der Veen | 126/91 |
| 5,632,197 | A * | 5/1997 | Lubawy | A47J 37/1247 126/391.1 |
| 5,766,382 | A * | 6/1998 | Hertzog | C21D 9/0018 148/656 |
| 5,840,101 | A | 11/1998 | Keller | 95/258 |
| 5,906,485 | A | 5/1999 | Groff | 432/121 |
| 5,993,202 | A | 11/1999 | Yamazaki et al. | 432/128 |
| 9,447,968 | B2 | 9/2016 | Satoh | |
| 2002/0045144 | A1 | 4/2002 | Mori et al. | 431/121 |
| 2003/0027095 | A1 | 2/2003 | Sugimoto et al. | 432/37 |
| 2003/0051647 | A1 | 3/2003 | Sugano et al. | 110/224 |
| 2003/0221647 | A1 | 12/2003 | Kobayashi et al. | 123/90.17 |
| 2003/0232300 | A1 | 12/2003 | Maruta et al. | |
| 2004/0076919 | A1 * | 4/2004 | Schwartz | F26B 3/283 432/175 |
| 2007/0220921 | A1 | 9/2007 | Zhao | 65/335 |
| 2008/0003531 | A1 | 1/2008 | Abbasi | 431/215 |
| 2010/0119985 | A1 * | 5/2010 | Potterill | D04H 1/4209 432/8 |
| 2011/0013892 | A1 | 1/2011 | Ragay et al. | 392/411 |
| 2013/0192591 | A1 | 8/2013 | Satoh et al. | 126/92 AC |
| 2013/0216965 | A1 | 8/2013 | Satoh | 431/328 |
| 2014/0106288 | A1 | 4/2014 | Satoh et al. | 432/147 |
| 2014/0116423 | A1 | 5/2014 | Satoh et al. | 126/92 AC |
| 2014/0170582 | A1 | 6/2014 | Satoh et al. | 432/147 |
| 2014/0220502 | A1 | 8/2014 | Satoh | |

FOREIGN PATENT DOCUMENTS

| | | |
|---|---|---|
| CN | 1517962 A | 8/2004 |
| CN | 101319849 A | 12/2008 |
| CN | 101978030 A | 2/2011 |
| CN | 201837226 U | 5/2011 |
| CN | 103765146 B | 11/2015 |
| DE | 2 115 399 A1 | 3/1972 |
| DE | 10 2011 006 171 A1 | 9/2012 |
| EP | 1 439 563 A2 | 7/2004 |
| EP | 2618053 A1 | 7/2013 |
| JP | 53-088017 | 8/1978 |
| JP | 59-086888 A | 5/1984 |
| JP | 06-018178 A | 1/1994 |
| JP | 08-313161 A | 11/1996 |
| JP | 2001-097781 | 4/2001 |
| JP | 2001-116463 A | 4/2001 |
| JP | 2001-165412 | 6/2001 |
| JP | 2001-330215 | 11/2001 |
| JP | 2002-350063 | 12/2002 |
| JP | 2003-021462 | 1/2003 |
| JP | 3657175 | 6/2005 |
| JP | A-2007-212082 | 8/2007 |
| JP | 2008-116072 A | 5/2008 |
| JP | 2013-053810 A | 3/2013 |
| TW | 332847 | 6/1998 |
| TW | 500910 B | 9/2002 |
| TW | 201033546 A | 9/2010 |
| WO | WO 2012/060377 A1 | 5/2012 |

OTHER PUBLICATIONS

Office Action dated May 5, 2015 issued in corresponding Taiwan Patent Application No. 101131979 (English translation of Search Report only).
International Search Report and Written Opinion dated Nov. 20, 2012 in corresponding PCT International Application No. PCT/JP2012/071781.
European Search Report, dated Jul. 14, 2015, issued in corresponding European Patent Application No. 12830158.7. Total 9 pages.
Wünning, J.A. et al., "Neue Keramische Brenner und Strahlrohre für die Beheizung von Wärmebehandlungsöfen" HTM Haerterei Technische Mitteilungen:Zeitschrift Fuer Werkstoffe, Waermebehandlung und Fertigung, Carl Hanser Verlag. Munchen, Germany. vol. 52, No. 3 (May 1997) pp. 145-149, XP000692554. (English Abstract).
Office Action dated Feb. 3, 2015 and Search Report in corresponding Chinese Patent Application No. 201280042593.7 (with English language translation)(12 pages).
Office Action dated Jan. 19, 2015 in related Chinese Patent Application No. 201280041982.8 with English language translation of Search Report (7 pages).
International Search Report and Written Opinion dated Nov. 20, 2012 in related PCT International Application No. PCT/JP2012/071789.
Office Action dated Feb. 26, 2015 in related Taiwan Patent Application No. 101131981 with English language translation of Search Report (6 pages).
Extended European Search Report dated Jul. 17, 2015 for related European Application No. 12829418.8.

* cited by examiner

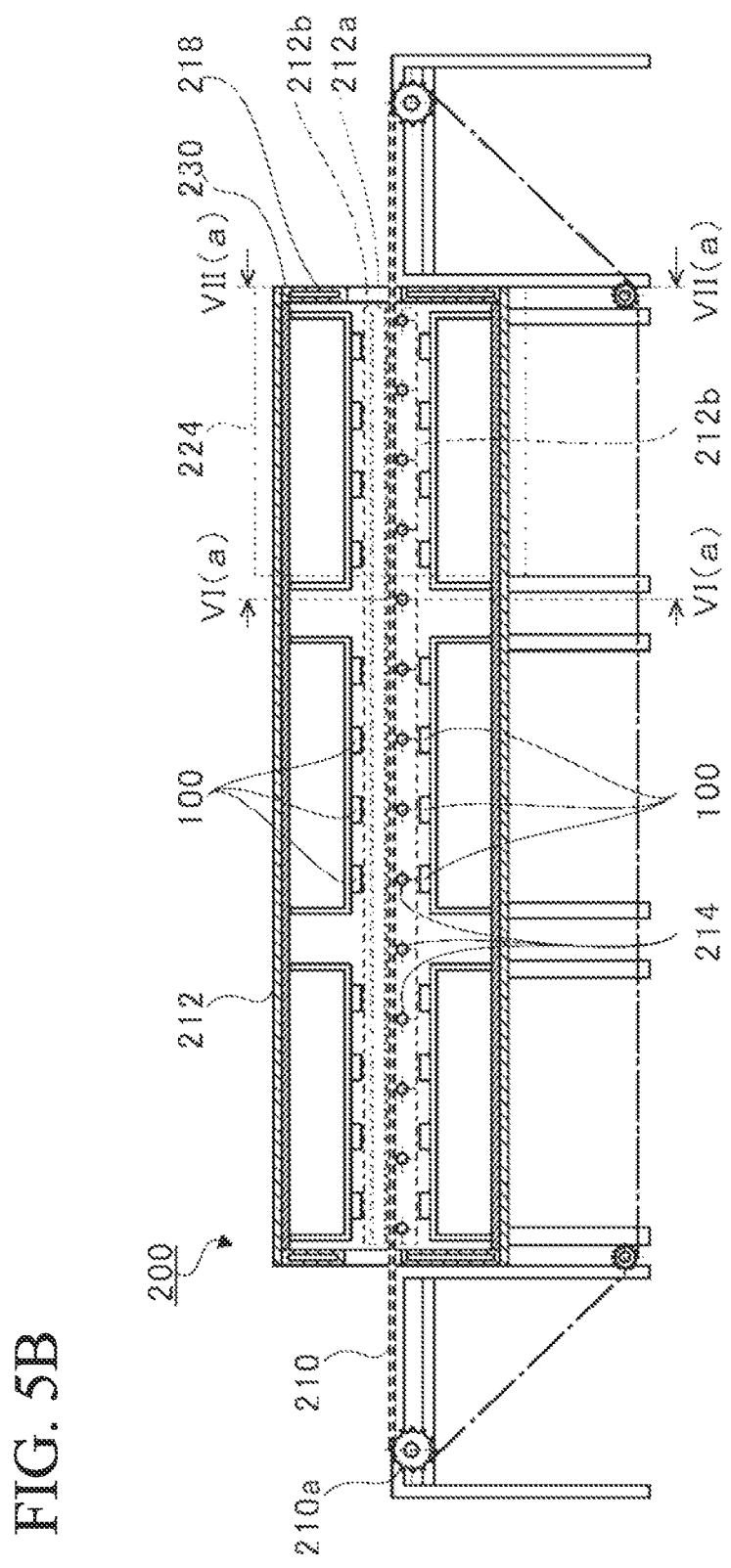

HEATING FURNACE AND CONTINUOUS HEATING FURNACE

This application is a continuation application based on a PCT Patent Application No. PCT/JP2012/071781, filed Aug. 29, 2012, whose priority is claimed on Japanese Patent Application No. 2011-192305, filed Sep. 5, 2011. The contents of both the PCT application and the Japanese Patent Application are incorporated herein by reference.

TECHNICAL FIELD

The present invention relates to a heating furnace and a continuous heating furnace that are configured to combust fuel to heat a burning target.

BACKGROUND ART

In the related art, heating furnaces including gas heaters used to heat a radiator with combustion heat generated by combusting a fuel gas and heating an industrial material, food, or the like, with radiant heat from a radiation surface of the radiator have been widely distributed.

In addition, a heating furnace configured to circulate a hot wind heated by an electric heater as well as a gas heater into a duct in which a burning target is placed and transfer radiant heat from the heated duct to the burning target has been proposed (for example, Patent Document 1).

DOCUMENT OF RELATED ART

Patent Document

[Patent Document 1] Japanese Patent No. 3657175

SUMMARY OF INVENTION

Technical Problem

However, when any one of the gas heater and the electric heater is used, a temperature in a furnace main body of the heating furnace becomes uniform through a decrease in temperature in the vicinity of a wall surface due to radiation from the wall surface of the furnace main body.

Here, for example, a configuration of raising the temperature in the vicinity of the wall surface by relatively increasing a heating power of the gas heater installed in the vicinity of the wall surface is considered. However, in this case, as the heating power of the gas heater is increased, a use amount of a fuel gas is increased and the temperature in the vicinity of the wall surface is increased. Accordingly, the radiation amount to the outside of the furnace main body is increased. As a result, thermal efficiency is decreased.

In consideration of the above-mentioned problems, an object of the present invention is to provide a heating furnace and a continuous heating furnace that are capable of uniformizing temperature distribution in a furnace main body without decreasing thermal efficiency.

Solution to Problem

A heating furnace according to a first aspect of the present invention includes a target space in which a burning target is disposed; and a furnace main body that surrounds the target space. In addition, the heating furnace further includes one or more closed gas heaters having an introduction hole configured to introduce a fuel gas into a heater main body, a combustion chamber in which the fuel gas introduced from the introduction hole is combusted, a discharge section configured to guide an exhaust gas generated by combustion in the combustion chamber, a radiation surface heated by the exhaust gas flowing through the discharge section or combustion in the combustion chamber and configured to transfer radiant heat to the burning target, and an exhaust hole configured to exhaust the exhaust gas that heats the radiation surface to the heater main body and disposed in the furnace main body; and an exhaust heat transfer section in communication with the exhaust hole of the closed gas heater and to which the exhaust gas is guided. Further, the exhaust heat transfer section is installed at any portion in the furnace main body except for a radiation space formed between the closed gas heater and the burning target disposed in the target space and configured to transfer the radiant heat to the burning target.

In the heating furnace according to a second aspect of the present invention, in the first aspect, the plurality of closed gas heaters may be disposed to be opposite to each other to sandwich the target space, the exhaust heat transfer section may be disposed to be opposite to a direction perpendicular to the opposite direction of the closed gas heater, and the burning space may be formed to be surrounded by the closed gas heater and the exhaust heat transfer section.

In the heating furnace according to a third aspect of the present invention, in the second aspect, the exhaust heat transfer section is disposed to be opposite to the closed gas heater to sandwich the target space.

The heating furnace according to a fourth aspect of the present invention further includes, in any one of the first to third aspects, an insulating section partially or entirely surrounding the radiation space and the exhaust heat transfer section and having thermal insulation.

In the heating furnace according to a fifth aspect of the present invention, in any one of the first to fourth aspects, the exhaust heat transfer section is constituted by an outer wall of the furnace main body; an inner wall spaced apart from the outer wall in an inner space of the furnace main body; and a void, to which the exhaust gas is guided, disposed between the outer wall and the inner wall.

A continuous heating furnace according to a sixth aspect of the present invention includes, in any one of the first to fifth aspects, the heating furnace and a conveyance body configured to convey the burning target in the furnace main body.

Effects of Invention

According to the present invention, temperature distribution in the furnace main body can be uniformized without decreasing thermal efficiency.

BRIEF DESCRIPTION OF DRAWINGS

FIG. 5B is a cross-sectional view taken along line V(b)-V(b) of FIG. 5A for describing an outline of the continuous heating furnace of the first embodiment of the present invention;

DESCRIPTION OF EMBODIMENTS

Figure 1:
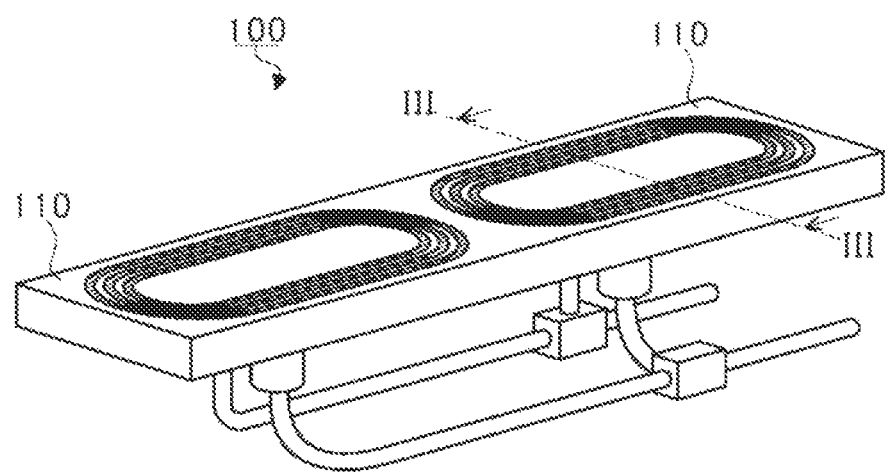
FIG. 1 is a perspective view showing an appearance example of a closed gas heater system according to a first embodiment of the present invention.

Exemplary embodiments of the present invention will be described in detail with reference to the accompanying drawings. Dimensions, materials, other specific numerical values, or the like, specified in the embodiments are merely examples for the convenience of understanding of the present invention and do not limit the present invention unless the context clearly indicates otherwise. In addition, in the embodiments, elements having substantially the same functions and configurations are designated by the same reference numerals and overlapping descriptions will not be repeated.

A continuous heating furnace of a first embodiment includes a plurality of closed gas heater systems installed in the furnace. First, the closed gas heater system will be described, and then a configuration of the continuous heating furnace will be described.

(First Embodiment: Closed Gas Heater System 100)

FIG. 1 is a perspective view showing an appearance example of a closed gas heater system 100 of a first embodiment. The closed gas heater system 100 according to the embodiment is a premixing type in which natural gas or the like and air as an oxidant gas for combustion are mixed before supply into a main body container. The closed gas heater system 100 is not limited thereto but may be a diffusion type in which diffusion combustion is performed.

As shown in FIG. 1, the closed gas heater system 100 includes a plurality of (in an example shown in FIG. 1, two) closed gas heaters 110, which are connected in parallel, and receives a mixed gas (hereinafter referred to as "a fuel gas") of natural gas or the like and air, so that the fuel gas is combusted in each of the closed gas heaters 110 to perform heating. In the closed gas heater system 100, an exhaust gas generated by the combustion is collected.

Figure 2:
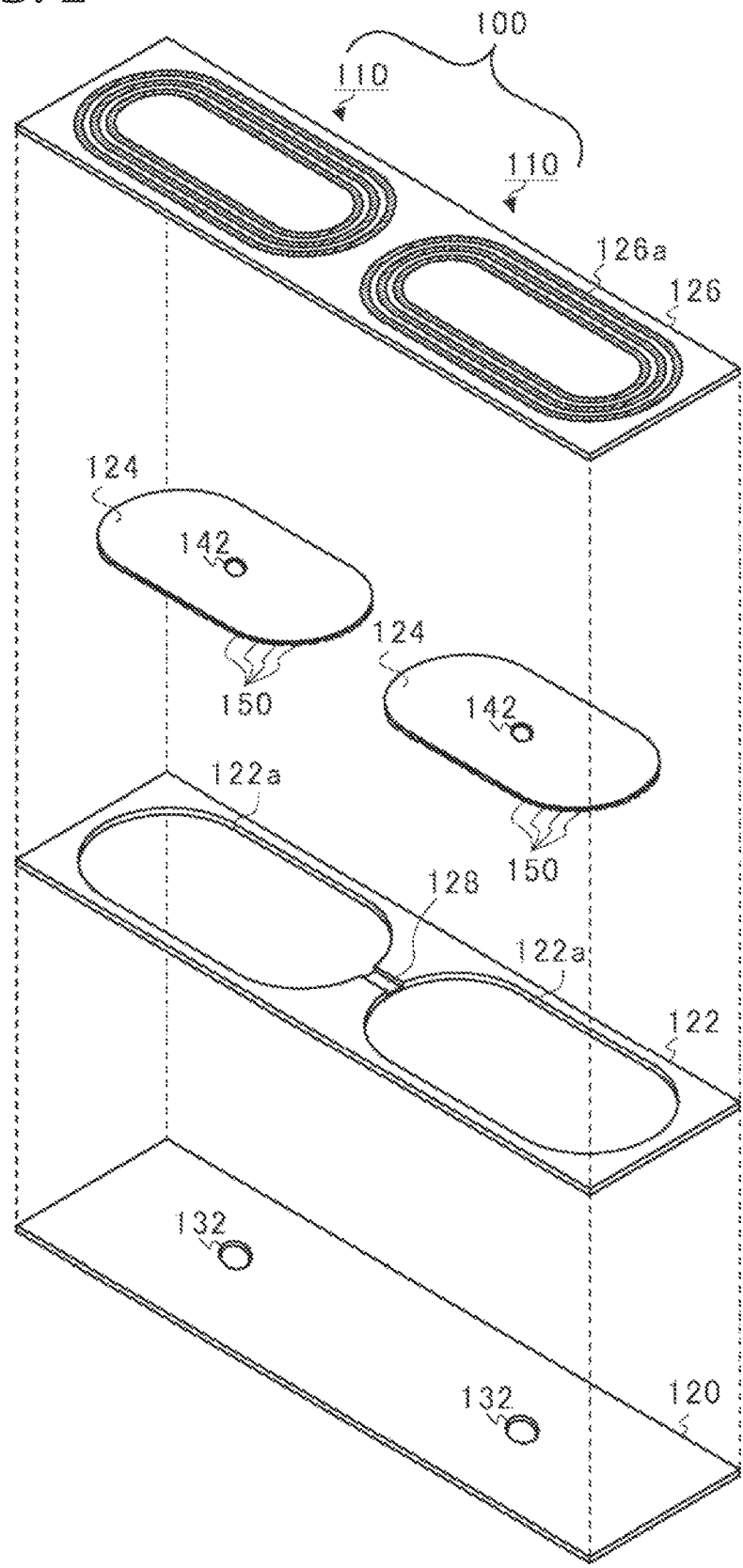
FIG. 2 is a view for describing a structure of the closed gas heater system according to the first embodiment of the present invention.

FIG. 2 is a view for describing a structure of the closed gas heater system 100 according to the first embodiment. As shown in FIG. 2, the closed gas heater system 100 includes a disposition plate 120, an outer circumferential wall 122, a partition plate 124 and a heating plate 126.

The disposition plate 120 is a thin plate-shaped member formed of a material having thermal resistance and oxidation resistance, for example, stainless steel (SUS: stainless used steel) or the like.

The outer circumferential wall 122 is constituted by thin plate-shaped members having an outer circumferential surface, which is flush with an outer circumferential surface of the disposition plate 120, and stacked on the disposition plate 120. The outer circumferential wall 122 includes an inner circumference having a track shape (a shape constituted by two substantially parallel lines and two arcs (semi circles) connecting the two lines), and two through-holes 122a passing therethrough in a thickness direction (a stacking direction of the outer circumferential wall 122 and the disposition plate 120).

Like the disposition plate 120, the partition plate 124 is formed of a material having high thermal resistance and oxidation resistance (for example, stainless steel), a material having high thermal conductivity (for example, brass), or the like. The partition plate 124 is constituted by a thin plate member, an exterior of which follows an inner circumferential surface of the through-hole 122a of the outer circumferential wall 122, that is disposed inside the outer circumferential wall 122 and parallel to the disposition plate 120. In addition, the outer circumferential surface of the partition plate 124 is spaced a certain interval from the inner circumferential surface of the through-hole 122a in a state in which the partition plate 124 is accommodated in the through-hole 122a of the outer circumferential wall 122.

Like the disposition plate 120, the heating plate 126 is constituted by a thin plate-shaped member formed of a material having high thermal resistance and oxidation resistance (for example, stainless steel), a material having high thermal conductivity (for example, brass), or the like. A concavo-convex section 126a in which concave and convex portions are formed is formed in the heating plate 126. According to the above-mentioned configuration, a difference in variation amount of thermal expansion is absorbed at the concavo-convex section 126a by a temperature difference between the heating plate 126 and the disposition plate 120 and a difference in materials of the heating plate 126 and the disposition plate 120, and stress generated from a coupling portion or the like to the outer circumferential wall 122 is reduced. For this reason, as heating and cooling are repeated, thermal fatigue and creep at high temperature can be suppressed. In addition, an area of a radiation surface (to be described below) of the heating plate 126 is increased. For this reason, radiant intensity can also be increased.

In addition, the disposition plate 120, the partition plate 124 and the heating plate 126 may be inclined to be opposite to each other when a void is formed therebetween. Further, thicknesses of the disposition plate 120, the partition plate 124 and the heating plate 126 are not limited, and the disposition plate 120 and the partition plate 124 may also have shapes with varying thicknesses.

The heating plate 126 has an appearance such that the outer circumferential surface is flush with outer circumferential surfaces of the disposition plate 120 and the outer circumferential wall 122 and is stacked on the outer circumferential wall 122 and the partition plate 124. Here, the heating plate 126 and the disposition plate 120 are disposed substantially in parallel (substantially in parallel to cause excessive enthalpy combustion in the embodiment).

A main body container of the closed gas heater system 100 is configured by closing upper and lower sides of the outer circumferential wall 122 with the heating plate 126 and the disposition plate 120. In addition, an area of upper and lower wall surfaces (outer surfaces of the heating plate 126 and the disposition plate 120) is larger than that of an outer circumferential surface (an outer surface of the outer circumferential wall 122). That is, the upper and lower wall surfaces occupy most of the outer surface of the main body container.

In addition, the closed gas heater system 100 is configured by connecting the two closed gas heaters 110 in parallel. A fire shift section 128 in communication with a closed space in the connected closed gas heaters 110 is formed at the connecting portion between the closed gas heaters 110. However, even when the closed space is used in a gas, the closed space may not be perfectly closed. In the closed gas heater system 100 of the embodiment, for example, a flame is spread to the closed gas heaters 110 connected through the fire shift section 128 to perform ignition by one ignition by an ignition apparatus such as an ignitor (not shown) or the like. As described above, while the two closed gas heaters 110 are installed at the closed gas heater system 100, the two closed gas heaters 110 also have the same configuration. For this reason, hereinafter, one of the closed gas heaters 110 will be described.

Figure 3A:
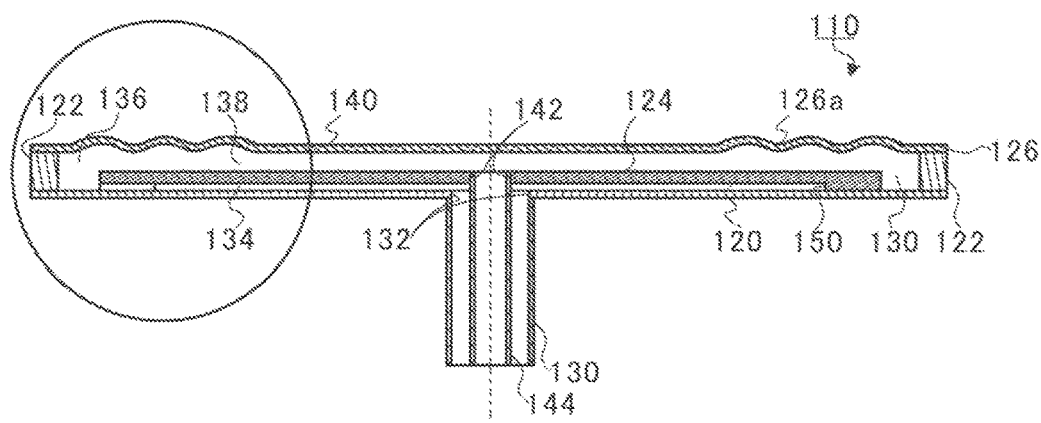
FIG. 3A is a cross-sectional view taken along line of FIG. 1.
Figure 3B:
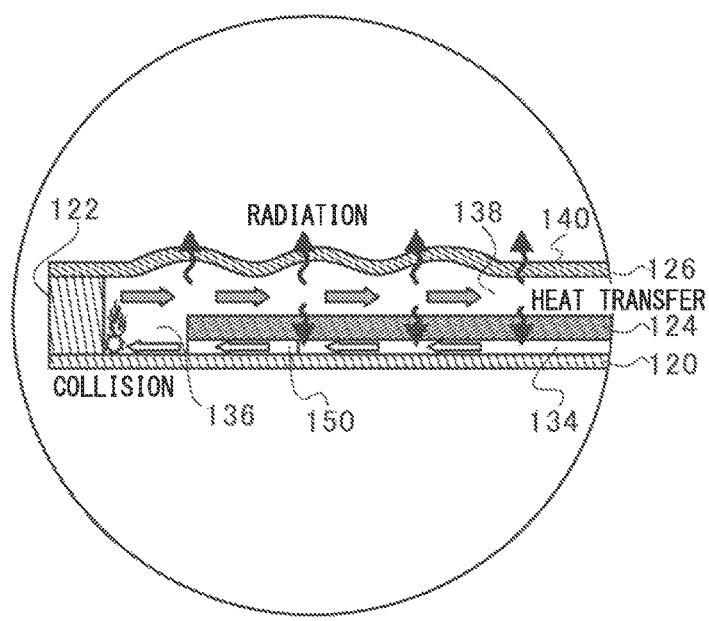
FIG. 3B is an enlarged view of a circular portion of FIG. 3A.

FIGS. 3A and 3B are cross-sectional views taken along line 111-111 of FIG. 1. As shown in FIG. 3A, an introduction hole 132 passing through a central section of the closed gas heater 110 in the thickness direction is formed in the disposition plate 120. A first piping section 130 through which a fuel gas flows is connected to the introduction hole 132. The fuel gas is guided into the closed gas heater 110 via the introduction hole 132.

An introduction section 134 and a discharge section 138 are formed to overlap in the main body container in the thickness direction (a direction perpendicular to an opposite surface of the disposition plate 120 and the heating plate 126).

The introduction section 134, which is a space sandwiched between the disposition plate 120 and the partition plate 124, is disposed to continue from a combustion chamber 136, and radially guides the fuel gas introduced from the introduction hole 132 into the combustion chamber 136.

The combustion chamber 136 is disposed in a space surrounded by the outer circumferential wall 122, the heating plate 126 and the disposition plate 120. In addition, the combustion chamber 136 faces an outer circumferential end section of the partition plate 124 and is formed along the outer circumferential wall 122. In the combustion chamber 136, the fuel gas introduced from the introduction hole 132 via the introduction section 134 is combusted. According to the configuration in which the combustion chamber 136 is formed along the outer circumferential wall 122, a volume of the combustion chamber 136 can be sufficiently secured and a combustion rate can be reduced in comparison with a Swiss roll type. A firing apparatus (not shown) is installed at an arbitrary position of the combustion chamber 136.

The discharge section 138, which is a space sandwiched between the heating plate 126 and the partition plate 124, is disposed to continue from the combustion chamber 136, and collects the exhaust gas generated by combustion in the combustion chamber 136 to a central section of the closed gas heater 110.

In addition, the introduction section 134 and the discharge section 138 are formed in the main body container to overlap in the thickness direction. Accordingly, heat of the exhaust gas can be transferred to the fuel gas through the partition plate 124 and the fuel gas can be preheated.

A radiation surface 140, which is an outer surface of the heating plate 126, is heated by the exhaust gas passing through the discharge section 138 or combustion in the combustion chamber 136 and transfers the radiant heat to the burning target.

An exhaust hole 142 passing through the central section of the closed gas heater 110 in the thickness direction is formed in the partition plate 124. A second piping section 144 is fitted into an inner circumferential portion of the exhaust hole 142. The exhaust gas that has heated the radiation surface 140 is exhausted to the outside of the closed gas heater 110 via the exhaust hole 142.

The second piping section 144 is disposed in the first piping section 130. That is, a dual pipe is constituted by the first piping section 130 and the second piping section 144. In addition, the second piping section 144 has a function of transferring heat of the exhaust gas to the fuel gas flowing through the first piping section 130.

The disposition plate 120 is fixed to a distal end of the first piping section 130, and the partition plate 124 is fixed to a distal end of the second piping section 144 protruding farther than the first piping section 130. The disposition plate 120 and the partition plate 124 are spaced apart from each other by a difference between the distal end of the first piping section 130 and the distal end of the second piping section 144.

In addition, in the embodiment, the second piping section 144 is disposed in the first piping section 130. The embodiment is not limited by the above-mentioned case, but the first piping section 130 and the second piping section 144 may be inserted into the introduction section 134 and the discharge section 138 from the heating plate 126 side, and the first piping section 130 may be disposed in the second piping section 144.

Next, flows of the fuel gas and the exhaust gas will be described in detail. In FIG. 3B showing an enlarged view of a circular portion of FIG. 3A, a white arrow is a flow of the fuel gas, a gray arrow is a flow of the exhaust gas, and a black arrow is movement of heat. When the fuel gas is supplied to the first piping section 130, the fuel gas flows from the introduction hole 132 into the introduction section 134 and flows toward the combustion chamber 136 while spreading radially in a horizontal direction. The fuel gas collides with the outer circumferential wall 122 in the combustion chamber 136 to be decreased in flow speed, is combusted by the ignited frame, and then becomes a high temperature exhaust gas. The exhaust gas flows through the discharge section 138 to transfer the heat to the radiation surface 140 of the heating plate 126, and then is discharged from the second piping section 144 to an exhaust heat transfer section (to be described below) through the exhaust hole 142.

The partition plate 124 is formed of a material that enables relatively easy thermal conduction. The heat of the exhaust gas passing through the discharge section 138 is transferred to the fuel gas passing through the introduction section 134 via the partition plate 124. The exhaust gas flowing through the discharge section 138 and the fuel gas flowing through the introduction section 134 are opposite flows (counter flows) that sandwich the partition plate 124. For this reason, the fuel gas can be efficiently preheated by the heat of the exhaust gas, and high thermal efficiency can be obtained. As the fuel gas is preheated and then combusted (excessive enthalpy combustion), combustion of the fuel gas is stabilized, and a concentration of CO (carbon monoxide) generated due to imperfect combustion can be suppressed to an extremely low concentration.

Further, in order to prevent backfire, a protrusion 150 is formed at a boundary between the introduction section 134 and the combustion chamber 136. A flame (propagation of a combustion reaction) from the combustion chamber 136 to the introduction section 134 is prevented by the protrusion 150. The protrusion 150 will be described with reference to FIGS. 4A and 4B.

Figure 4A:
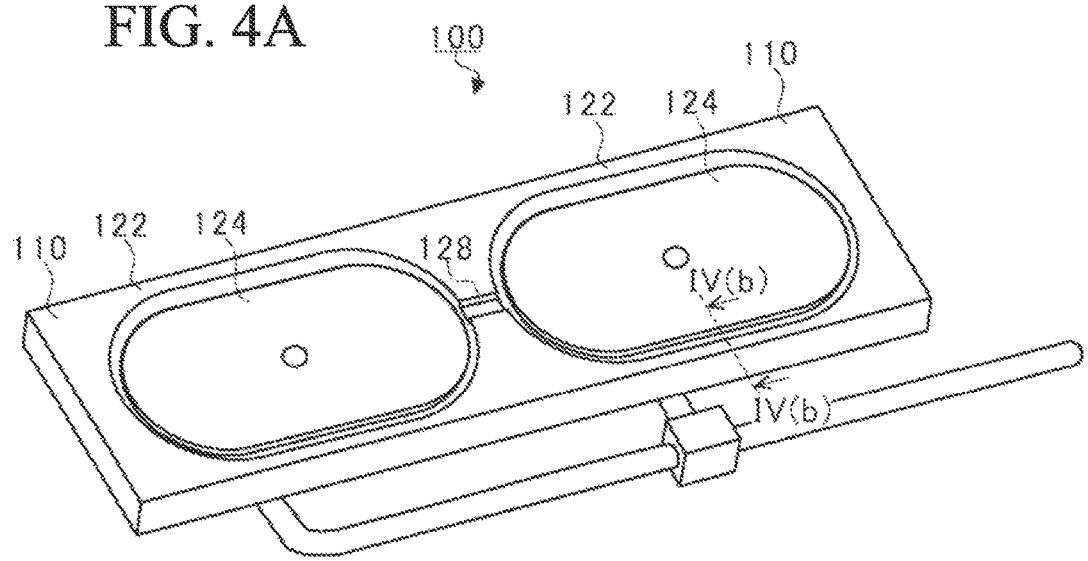
FIG. 4A is a perspective view of the closed gas heater system for describing a plurality of protrusions.
Figure 4B:
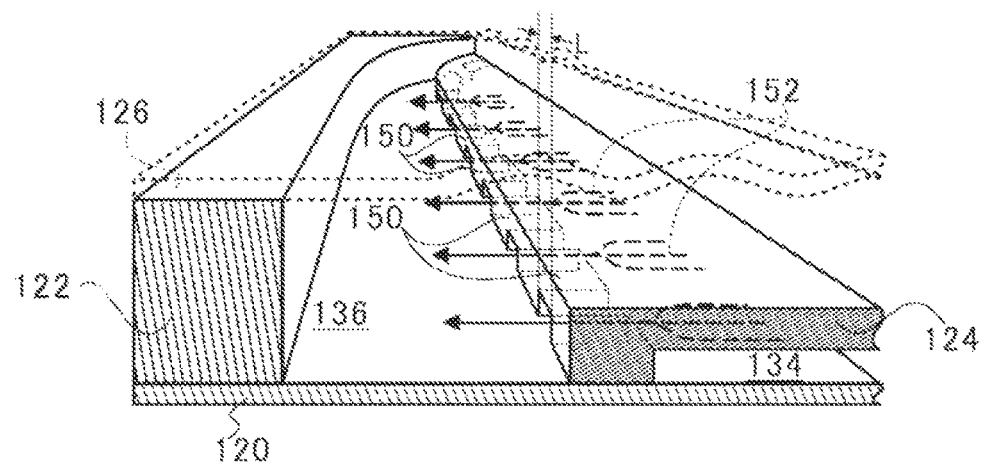
FIG. 4B is a view for describing the plurality of protrusions when a cross-section taken along line IV(b)-IV(b) of FIG. 4A is seen in a direction of an arrow.

FIGS. 4A and 4B are views for describing the plurality of protrusions 150. FIG. 4A is a perspective view of the closed gas heater system 100 except for the heating plate 126, and FIG. 4B is a cross-sectional view taken along line IV(b)-IV(b) of FIG. 4A when seen in a direction of an arrow. In FIG. 4B, in order to easily understand a structure of the plurality of protrusions 150, portions of the heating plate 126 and the protrusion 150 hidden by the partition plate 124 are shown by broken lines. In addition, an arrow 152 shows a direction of a flow of the fuel gas. The introduction section 134 has a flow path cross-section narrowed by the plurality of protrusions 150 installed at the partition plate 124. The fuel gas flows into the combustion chamber 136 through a void between the neighboring protrusions 150 in the introduction section 134 as shown in FIGS. 3B and 4B.

As described above, according to the closed gas heater system 100 of the embodiment, since the fuel gas is preheated by the heat of the exhaust gas, high thermal efficiency can be obtained and the exhaust gas is not diffused. Accordingly, the heat of the exhaust gas can be effectively used in a continuous heating furnace 200 (to be described below).

Next, the continuous heating furnace 200 in which the plurality of closed gas heater systems 100 are disposed will be described.

Figure 5A:
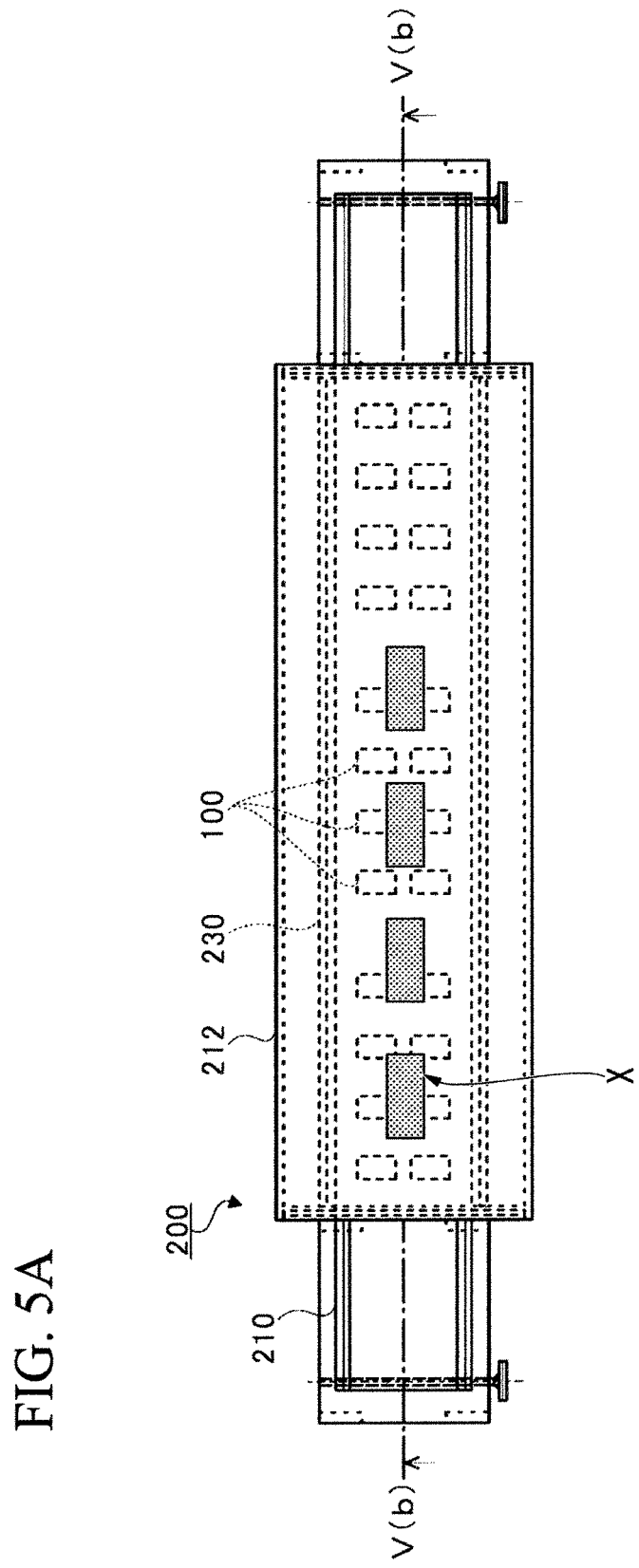
FIG. 5A is a plan view of a continuous heating furnace according to the first embodiment of the present invention for describing an outline of the continuous heating furnace.

FIGS. 5A and 5B are views for describing an outline of the continuous heating furnace 200 according to the first embodiment. In particular, FIG. 5A is a plan view of the continuous heating furnace 200, and FIG. 5B is a cross-sectional view taken along line V(b)-V(b) of FIG. 5A.

A conveyance body 210 is constituted by a conveyor, for example, a belt or the like, stretched and supported by a roller 214 and rotated by a gear 210a receiving power of a motor (not shown) to convey the burning target. The burning target X is disposed on the conveyance body 210. The burning target X is hung and supported by, for example, a hoist mechanism (not shown) installed at the conveyance body 210. In addition, in the embodiment, in a furnace main body 212, the space in which the burning target X is disposed and through which the burning target passes upon conveyance is referred to as a target space 212a.

The furnace main body 212 forms a burning space partially or entirely surrounding the conveyance body 210. That is, the furnace main body 212 also surrounds the target space 212a.

The roller 214 supports a portion of the conveyance body 210 in the furnace main body 212 from a lower side in a vertical direction. In addition, in order to suppress deflection of the burning target, when the conveyance body is constituted by a pair of nets that sandwich upper and lower sides of the burning target, the roller 214 may be installed at the outside of the pair of nets.

The plurality of closed gas heater systems 100 are disposed in the furnace main body 212. In the embodiment, the plurality of closed gas heater systems 100 are disposed in the furnace main body 212 at upper and lower sides in the vertical direction of the conveyance body 210.

Figure 6A:
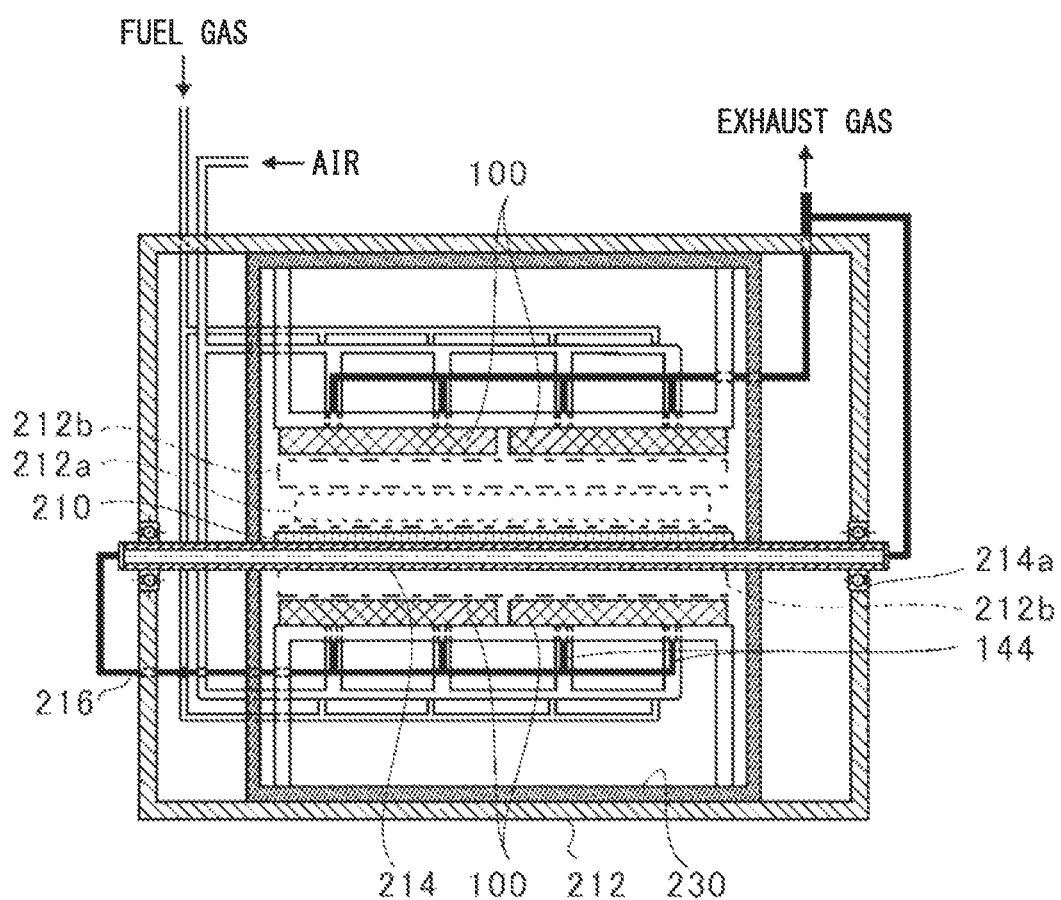
FIG. 6A is a cross-sectional view taken along line VI(a)-VI(a) of FIG. 5B for describing heat exchange of a roller according to the first embodiment of the present invention.
Figure 6B:
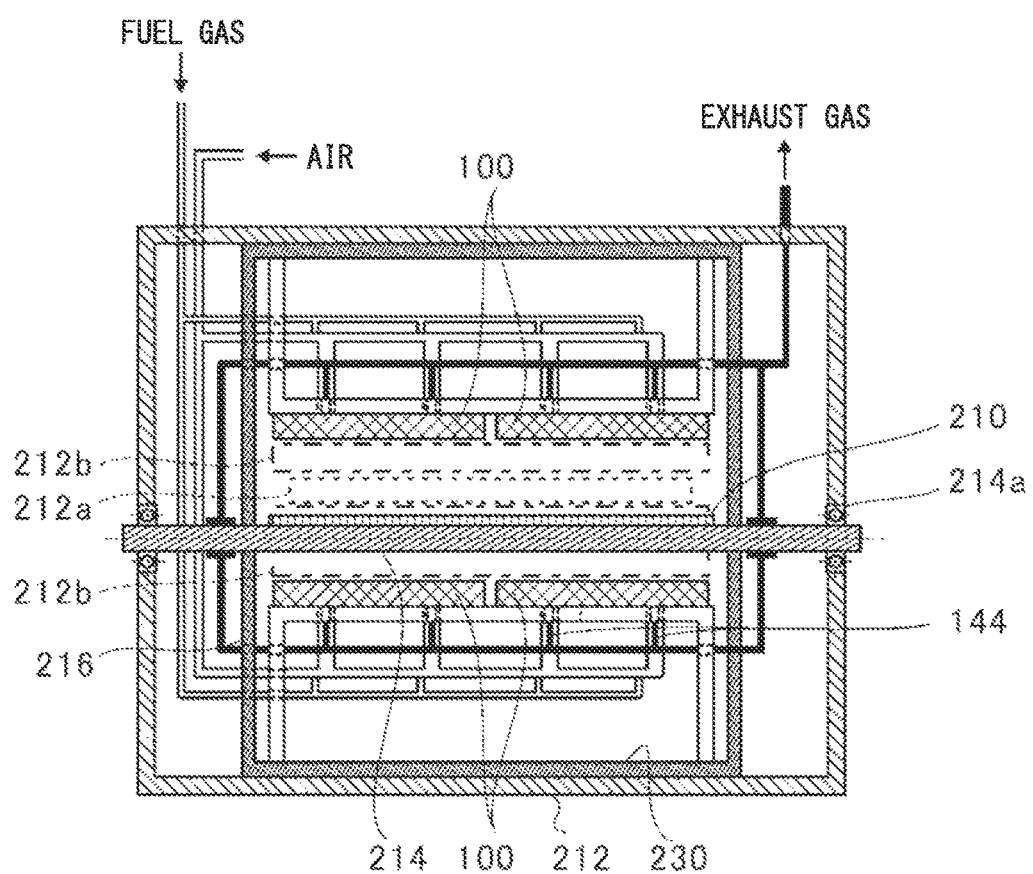
FIG. 6B is a view for describing the heat exchange of the roller according to the first embodiment of the present invention.

FIGS. 6A and 6B are views for describing heat exchange of the roller 214 according to the first embodiment. FIG. 6A is a cross-sectional view taken along line VI(a)-VI(a) of FIG. 5B. For the convenience of understanding of a structure of the roller 214, description of the heat-retention wall and the heat-retention pipe (to be described below) will be omitted. In addition, in the following drawings, a flow path of the exhaust gas (a space through which the exhaust gas flows) is shown in black, and the closed gas heater system 100 is cross-hatched.

As shown in FIG. 6A, an end section of the roller 214 passes through the wall surface of the furnace main body 212 to be exposed to the outside of the furnace main body 212 and is rotatably supported by a bearing 214a installed at a penetration portion of the wall surface.

An exhaust pipe 216 comes in communication with the second piping section 144 of the closed gas heater system 100 to guide the exhaust gas. A portion of a pipe extending from the closed gas heater system 100 at which the pipe is bent is referred to as the second piping section 144, and a pipe to which the plurality of second piping sections 144 are connected to a downstream side by the portion at which the pipe is bent is referred to as the exhaust pipe 216.

The exhaust pipe 216 has a configuration that enables heat exchange between the exhaust gas flowing through the exhaust pipe 216 and the roller 214. Specifically, as shown in FIG. 6A, the roller 214 is hollow, and the exhaust pipe 216 is connected to an end section of the roller 214 outside the furnace main body 212. In addition, the exhaust gas flowing through the exhaust pipe 216 is guided into the roller 214.

The entire roller 214 can be warmed by the configuration in which the exhaust gas flows through the roller 214. In addition, absorption of the heat into the furnace main body 212 can be suppressed at any position of the roller 214, radiation to the outside of the furnace main body 212 through the roller 214 can be suppressed, and a decrease in temperature in the furnace main body 212 can be suppressed.

In addition, the roller 214 may be constituted by, for example, a shaft core and a tubular rotating body through which the shaft core passes, and the rotating body may be rotatably supported with respect to the shaft core fixed to the furnace main body 212. In this case, when the shaft core is hollow and the exhaust gas passing through the exhaust pipe 216 is guided into the shaft core, the structure can be simplified.

In addition, the exhaust pipe 216 may have a configuration that enables heat exchange with a portion of the roller 214 protruding in a direction perpendicular to the conveyance direction of the burning target more than the conveyance body 210 in the furnace main body 212. In an example shown in FIG. 6B, the exhaust pipe 216 surrounds and comes in partial contact with the portion protruding in the direction perpendicular to the conveyance direction of the burning target more than the conveyance body 210 to enable heat exchange with the roller 214, and extends in a vertical direction as it is.

According to a configuration in which the portion of the roller 214 protruding from the conveyance body 210 to be spaced apart from the closed gas heater system 100 is warmed with the heat of the exhaust gas, a mechanism configured to suppress a decrease in temperature of the roller 214 in the vicinity of the target space 212a can be realized as a simple configuration. As a result, manufacturing cost can be controlled.

As described above, in the continuous heating furnace 200 of the embodiment, the closed gas heater system 100 is a closed structure. Accordingly, the exhaust gas is guided to the exhaust pipe 216 at a high temperature without diffusion thereof. For this reason, the temperature of the exhaust pipe 216 is higher than that of the roller 214, and the roller 214 can be securely warmed. Accordingly, a decrease in temperature of the roller 214 in the vicinity of the burning target can be suppressed. Further, since the continuous heating furnace 200 uses the exhaust heat of the exhaust gas in the heat exchange with the roller 214, a new heat source is unnecessary. Accordingly, a decrease in thermal efficiency of the entire heating processing can be prevented.

In addition, in the embodiment, while the configuration in which the end section of the roller 214 is exposed to the outside of the furnace main body 212 has been exemplified, the entire roller 214 may be accommodated in the furnace main body 212. Even in this case, the roller 214 is warmed by heat exchange between the exhaust gas passing through the exhaust pipe 216 and the roller 214. For this reason, in the roller 214, a decrease in temperature generated due to heat transfer from the vicinity of the target space 212a to the portion spaced apart from the closed gas heater system 100 (a decrease in temperature in the vicinity of the target space 212a) can be suppressed.

In addition, in the inside of the furnace main body 212 or the outside of the furnace main body 212, when the exhaust gas may be diffused, the exhaust gas passing through the exhaust pipe 216 may be directly blasted to the roller 214. Eventually, when the heat exchange between the exhaust gas guided to the exhaust pipe 216 and the roller 214 becomes possible, a new heat source is unnecessary. Accordingly, a decrease in thermal efficiency of the entire heating processing can be suppressed.

Next, the heat-retention wall, the heat-retention pipe, the heat-retention board and the heat-retention layer that can be used to keep the inside of the furnace main body 212 warm will be described with reference to FIGS. 7A to 12B. For the convenience of understanding of these structures, in FIGS. 7A to 12B, description of the above-mentioned exhaust pipe 216 will be omitted.

Figure 7A:
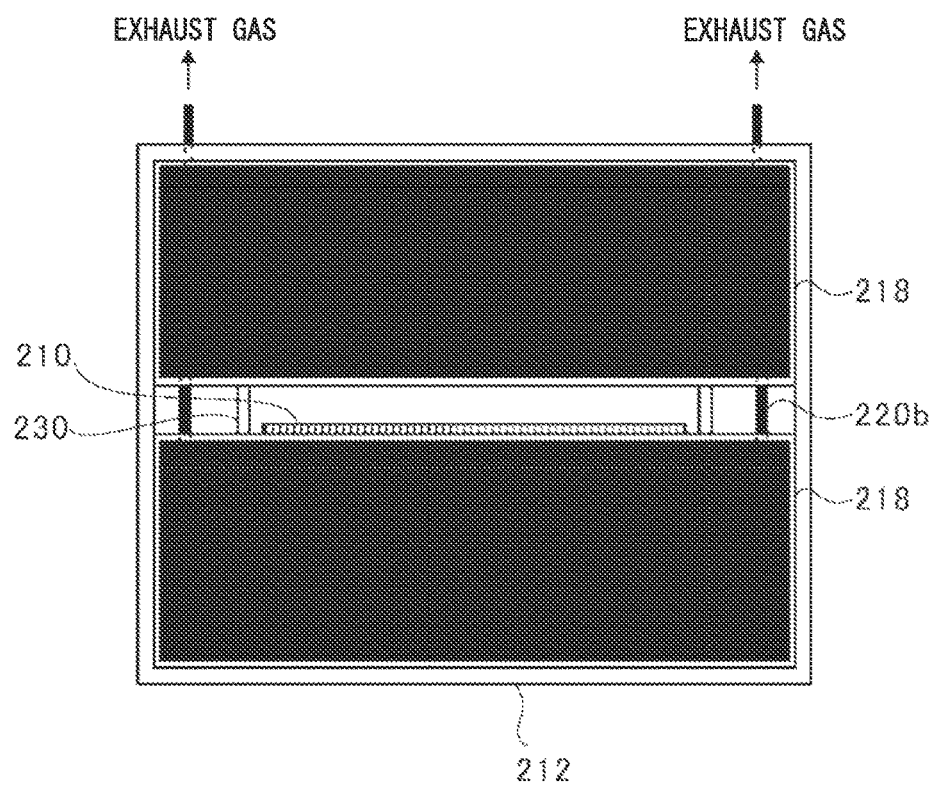
FIG. 7A is a view for describing a heat-retention wall and a heat-retention pipe according to the first embodiment of the present invention.
Figure 7B:
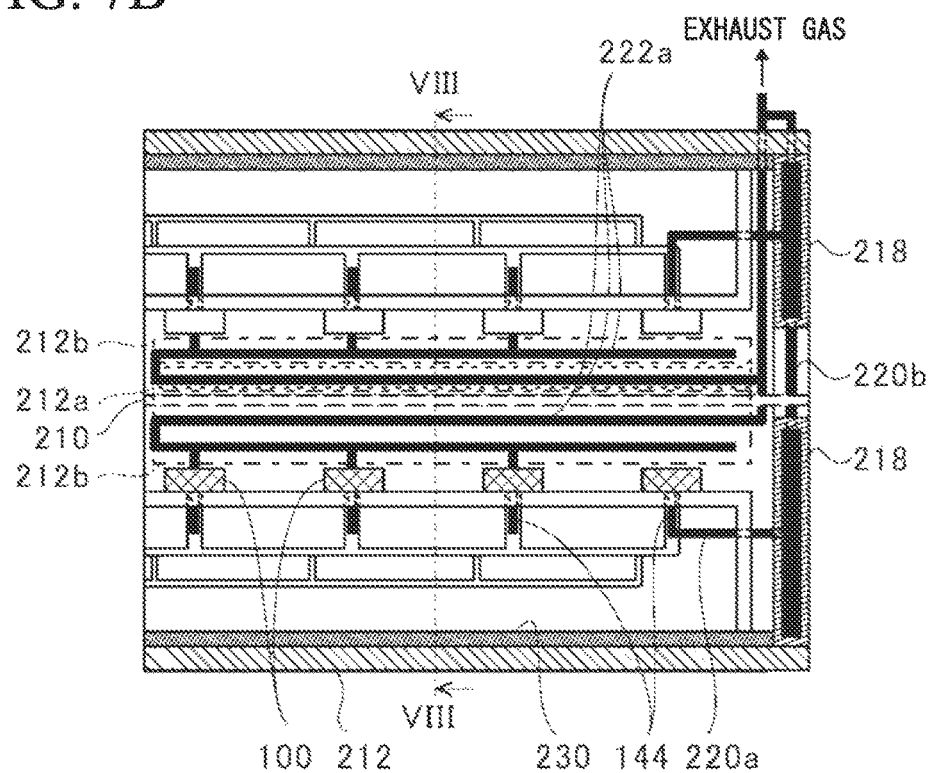
FIG. 7B is an enlarged view of a rectangular portion of FIG. 5B for describing the heat-retention wall and the heat-retention pipe according to the first embodiment of the present invention.

FIGS. 7A and 7B are views for describing a heat-retention wall 218 and a heat-retention pipe 222a of the first embodiment. FIG. 7A is a cross-sectional view taken along line VII(a)-VII(a) of FIG. 5B, and FIG. 7B is an enlarged view of a rectangular portion 224 of FIG. 5B.

As shown in FIGS. 7A and 7B, the heat-retention wall 218 is disposed at the end section in the conveyance direction of the continuous heating furnace 200 with a gap needed for conveyance of the burning target remaining. The heat-retention wall 218 has a hollow inner space, and the exhaust gas discharged from the closed gas heater system 100 of the end section side (closest to the insulated wall 218) is guided via a communication pipe 220a. In addition, the upper and lower heat-retention walls 218 are in communication with each other via a communication pipe 220b. In FIGS. 7A and 7B, while the end section in rear in the conveyance direction is shown, the heat-retention wall 218 has the same configuration as the end section in front in the conveyance direction.

Figure 8:
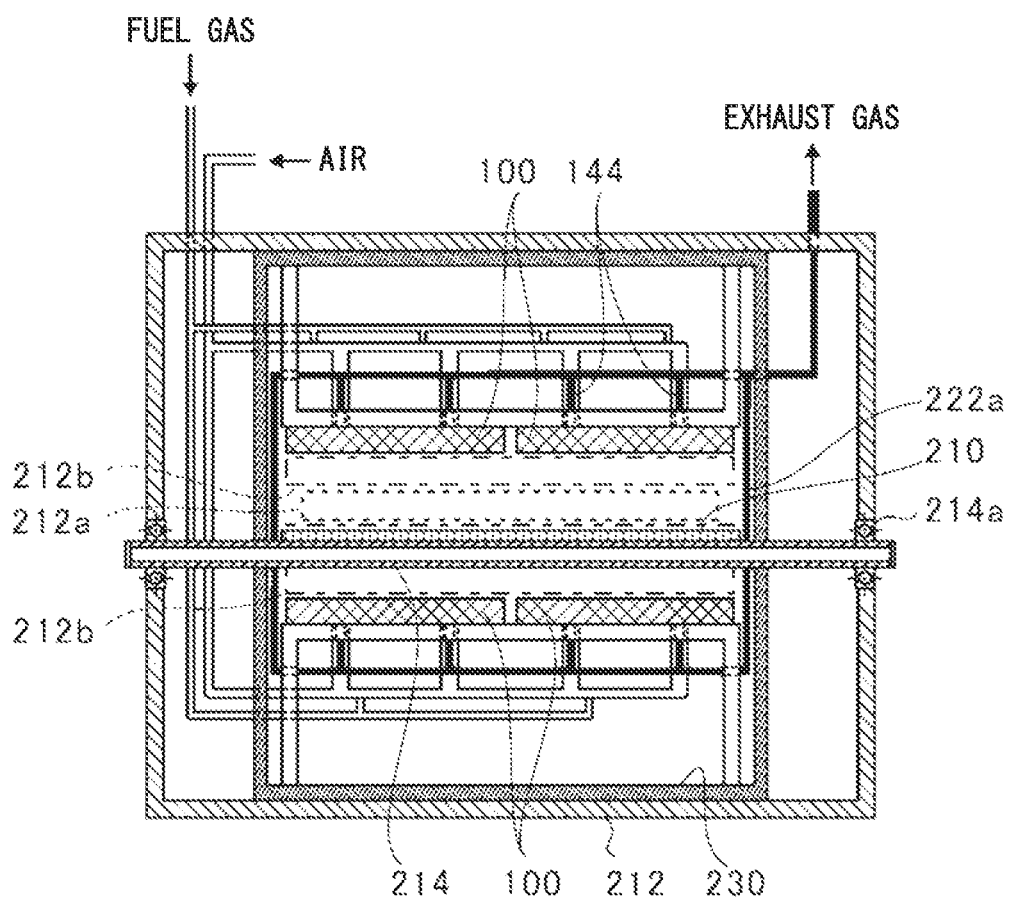
FIG. 8 is a cross-sectional view taken along line VIII-VIII of FIG. 7B.

FIG. 8 is a cross-sectional view taken along line VIII-VIII of FIG. 7B. The exhaust gas exhausted from the closed gas heater system 100 is guided through the heat-retention pipe 222a shown in FIGS. 7B and 8. The insulated pipe 222a is in communication with the second piping section 144, and as shown in FIG. 8, goes around and moves to the outside of the closed gas heater system 100. As shown in FIGS. 7B and 8, the heat-retention pipe 222a extends and repeatedly turns in the conveyance direction along side surfaces of the target space 212a parallel to the conveyance direction and the vertical direction.

An insulating section 230 shown in FIG. 7B has thermal insulation, and partially or entirely surrounds a radiation space 212b and the heat-retention pipe 222a. As shown in FIG. 8, the radiation space 212b is formed between the burning target (not shown) disposed in the target space 212a and the closed gas heater systems 100 disposed at upper and lower sides in the vertical direction. The radiation space 212b is a space in which the radiant heat is transferred to the burning target.

According to the configuration including the insulating section 230, the continuous heating furnace 200 can suppress radiation from the wall surface of the furnace main body 212 and improve thermal efficiency.

As described above, in the continuous heating furnace 200, the plurality of closed gas heater systems 100 are disposed to be opposite to each other to sandwich the target space 212a. The heat-retention pipe 222a is disposed to be opposite to a direction perpendicular to the opposite direction of the closed gas heater system 100. In addition, the radiation space 212b is surrounded by the closed gas heater system 100 and the heat-retention pipe 222a.

According to the above-mentioned configuration, the continuous heating furnace 200 keeps the portion at which the closed gas heater system 100 is not disposed warm with the heat-retention pipe 222a while performing radiation heating using the closed gas heater system 100 to sandwich the burning target. For this reason, a decrease in temperature of the target space 212a can be suppressed.

In the continuous heating furnace 200 of the first embodiment, the closed gas heater system 100 is a closed structure. Accordingly, the exhaust gas is guided to the heat-retention wall 218 or the heat-retention pipe 222a at a high temperature without spreading in the furnace or the like. The heat-retention pipe 222a is disposed between the target space 212a and the wall surface of the furnace main body 212 or the portion in the furnace main body 212 at which the temperature is relatively lower. Accordingly, the continuous heating furnace 200 uniformizes the temperature distribution in the furnace main body 212. In addition, since the exhaust heat of the exhaust gas is used, a new heat source is unnecessary. Accordingly, a decrease in thermal efficiency of the entire heating processing can be prevented.

(Second Embodiment)

Next, heat-retention pipes 222b and 222c according to a second embodiment will be described. In the second embodiment, only the heat-retention pipes 222b and 222c are different from the first embodiment. For this reason, description of the same configuration as of the first embodiment will be omitted and only the heat-retention pipes 222b and 222c will be described.

Figure 9A:
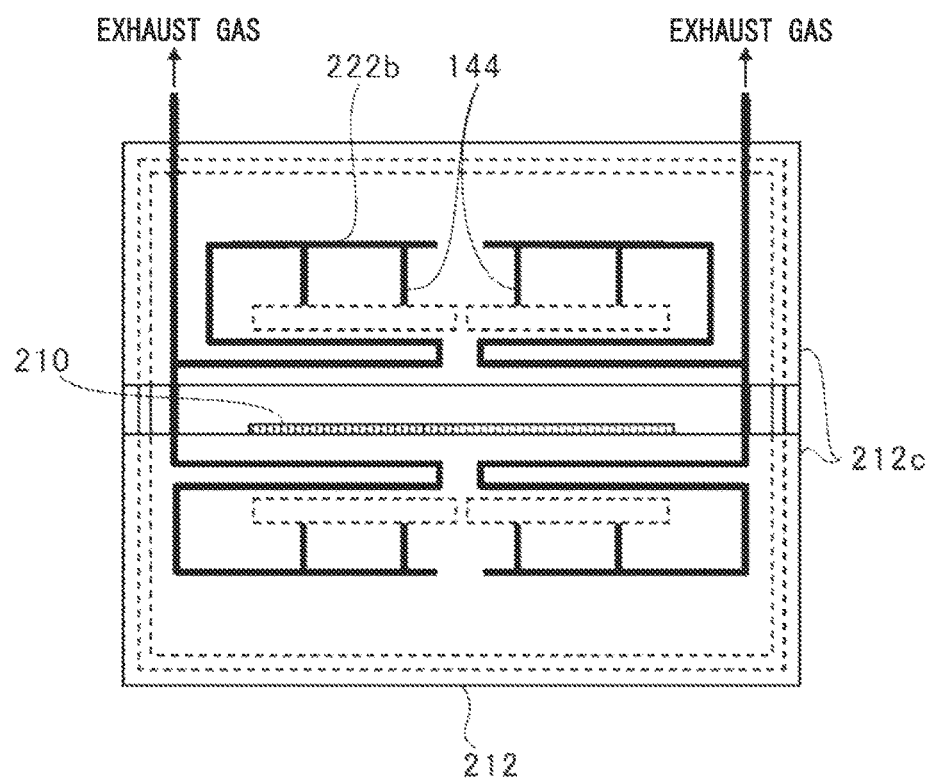
FIG. 9A is a cross-sectional view taken along line VII(a)-VII(a) of FIG. 5B for describing a heat-retention pipe according to a second embodiment of the present invention.
Figure 9B:
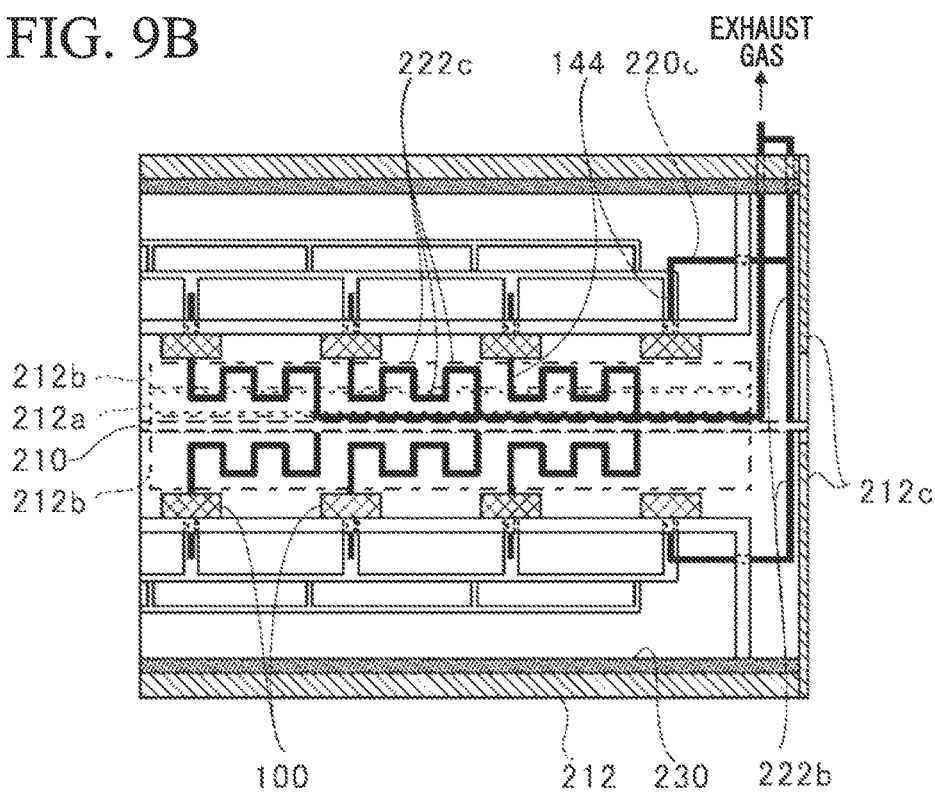
FIG. 9B is a view for describing the heat-retention pipe according to the second embodiment of the present invention.

FIGS. 9A and 9B are views for describing the heat-retention pipes 222b and 222c according to the second embodiment. FIG. 9A is a cross-sectional view of the same position as FIG. 7A, and FIG. 9B is an enlarged view of the same position as FIG. 7B. However, for the convenience of understanding of the position of the heat-retention pipe 222b, in FIG. 9A, it has been specified that the heat-retention pipe 222b hidden by a wall surface 212c at an inner side (a rear surface side) of the furnace main body 212 and shown by broken lines is shown in black. In addition, in FIG. 9B, description of the roller 214 will be omitted.

The heat-retention wall 218 configured to guide the exhaust gas thereinto is disposed at the end section in the conveyance direction of the continuous heating furnace 200 according to the first embodiment (see FIGS. 7A and 7B). In the second embodiment, as shown in FIGS. 9A and 9B, the end section in the conveyance direction of the continuous heating furnace 200 is covered by the simple wall surface 212c. The heat-retention pipe 222b is disposed along the wall surface 212c inside the furnace main body 212 in the wall surface 212c.

The exhaust gas discharged from the second piping section 144 of the closed gas heater system 100 close to the end section of the continuous heating furnace 200 (closest to the wall surface 212c) is guided to the retention pipe 222b via a communication pipe 220c.

In addition, the heat-retention pipe 222a according to the first embodiment extends and repeatedly turns in the conveyance direction along side surfaces of the target space 212a parallel to the conveyance direction and parallel to the vertical direction (see FIG. 8). The heat-retention pipe 222c according to the second embodiment is in communication with the second piping section 144, and like the heat-retention pipe 222a shown in FIG. 8, goes around and moves to the outside of the closed gas heater system 100. As shown in FIG. 9B, the heat-retention pipe 222c is disposed at upper and lower sides in a concave-convex shape in the vertical direction along the surfaces parallel with respect to the conveyance direction and parallel to the vertical direction.

In the second embodiment, the same effect as of the first embodiment can be obtained. That is, in the continuous heating furnace 200, temperature distribution in the furnace main body 212 is uniformized. In addition, since the exhaust heat of the exhaust gas is used, a new heat source is unnecessary. Accordingly, a decrease in thermal efficiency of the entire heating processing can be prevented.

(Third Embodiment)

Next, a heat-retention board 226a according to a third embodiment will be described. In the third embodiment, only the heat-retention board 226a is different from the first embodiment. For this reason, description of the same components as of the first embodiment will be omitted, and only the heat-retention board 226a will be described.

Figure 10A:
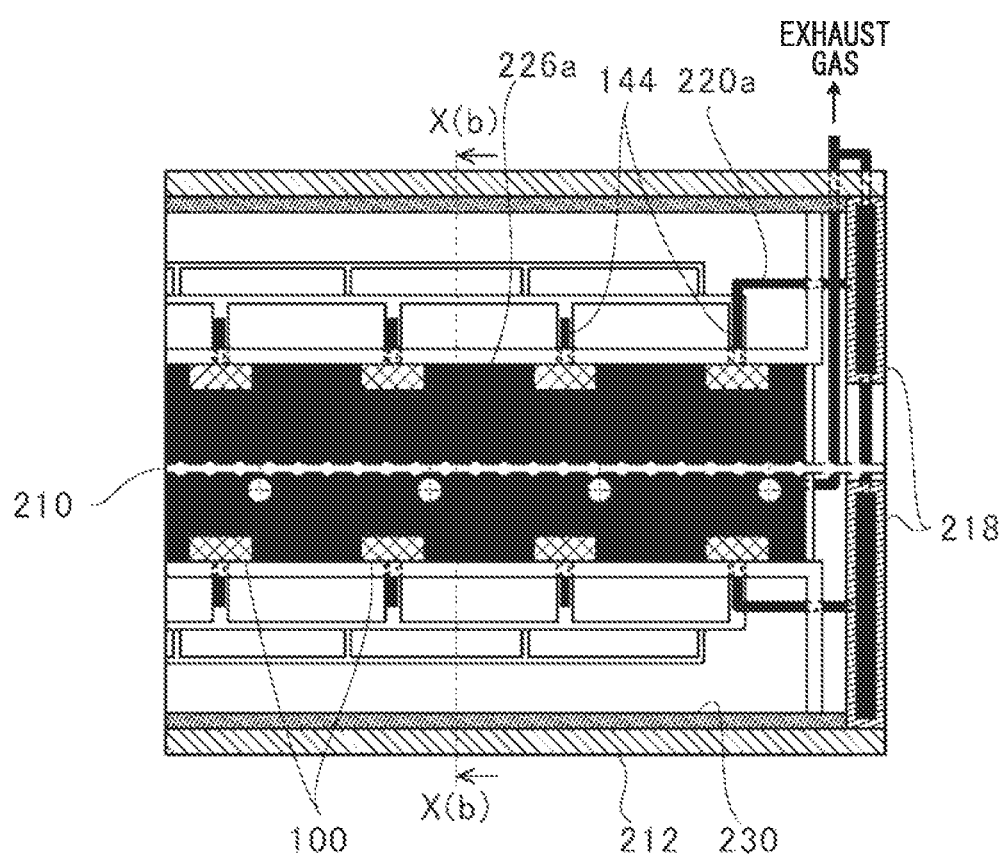
FIG. 10A is a view for describing a heat-retention board according to a third embodiment of the present invention.
Figure 10B:
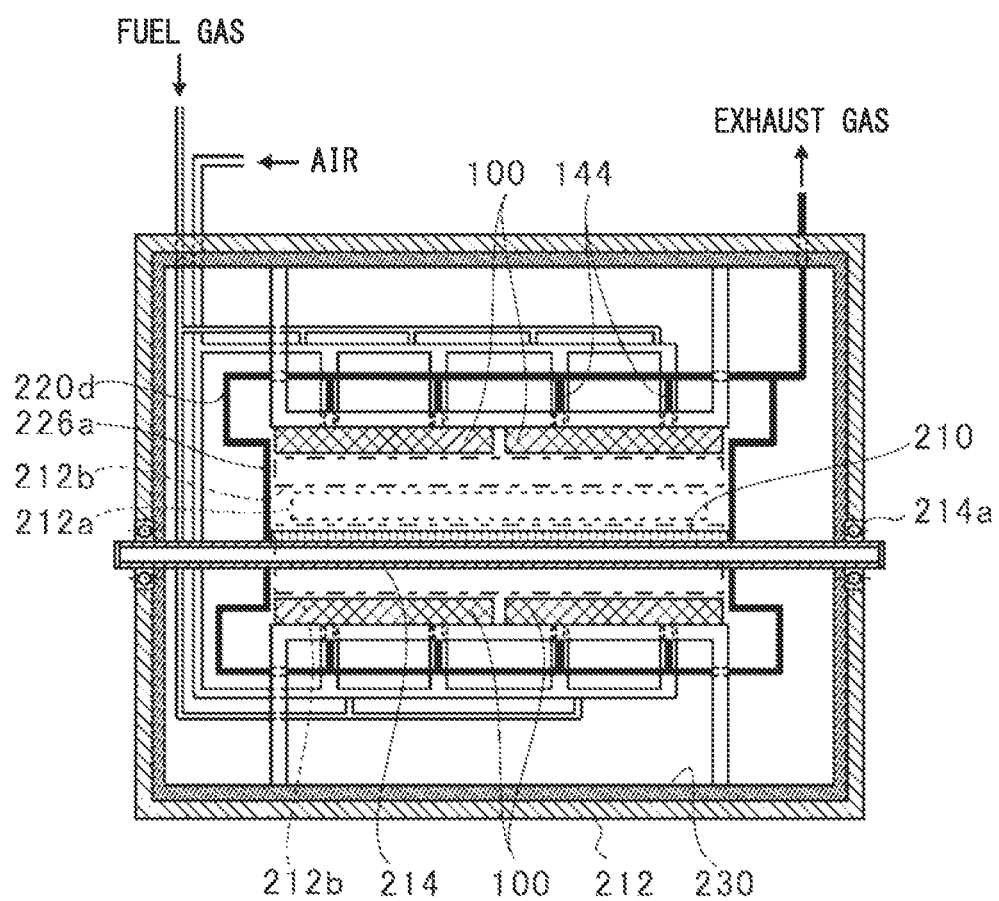
FIG. 10B is a view for describing the heat-retention board according to the third embodiment of the present invention.

FIGS. 10A and 10B are views for describing the heat-retention board 226a according to the third embodiment. FIG. 10A is an enlarged view of the same position as FIG. 7B, and FIG. 10B is a cross-sectional view taken along line X(b)-X(b) of FIG. 10A.

The heat-retention pipe 222a according to the first embodiment extends and repeatedly turns in the conveyance direction along side surfaces of the target space 212a parallel to the conveyance direction and parallel to the vertical direction. As shown in FIGS. 10A and 10B, the heat-retention board 226a according to the third embodiment forms a wall surface configured to cover side surfaces of the closed gas heater system 100 of an upper side in the vertical direction and the closed gas heater system 100 of a lower side in the vertical direction along the side surfaces parallel to the conveyance direction and parallel to the vertical direction. The heat-retention board 226a is configured to have a hollow inner space, and the inner space is in communication with the second piping section 144 via a communication pipe 220d. Accordingly, the exhaust gas is guided into the heat-retention board 226a.

In the embodiment, the target space 212a and the radiation space 212b are completely covered by the closed gas heater system 100 and the heat-retention board 226a.

In the third embodiment, the same effect as of the second embodiment can be realized.

(Fourth Embodiment)

Next, a heat-retention layer 228 according to a fourth embodiment will be described. In the fourth embodiment, only the heat-retention layer 228 is different from that of the first embodiment. Description of the same configuration as in the first embodiment will be omitted, and only the heat-retention layer 228 will be described.

Figure 11:
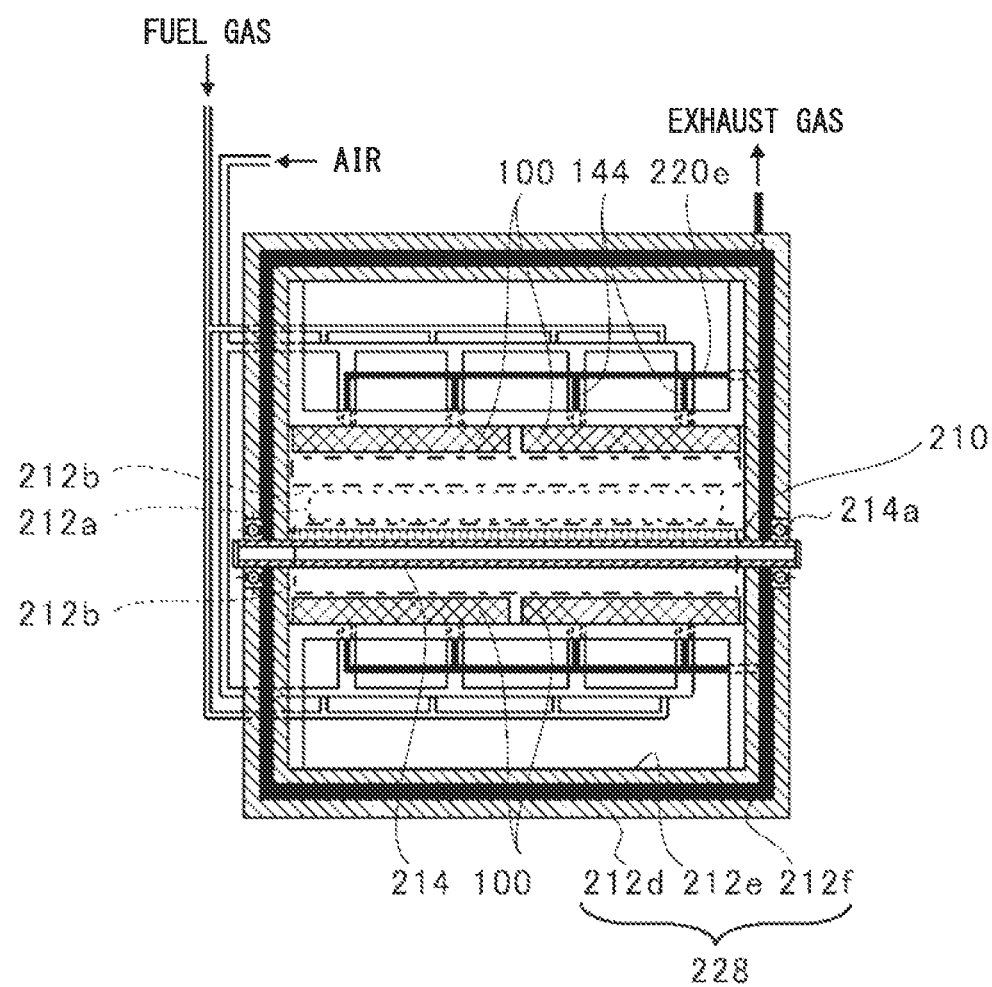
FIG. 11 is a view for describing a heat-retention layer according to a fourth embodiment of the present invention.

FIG. 11 is a view for describing the heat-retention layer 228 according to the fourth embodiment. In FIG. 11, a cross-sectional view of the same position as in FIG. 10B is shown. However, in the embodiment, a width of the furnace main body 212 is narrowed more than that of the third embodiment. As shown in FIG. 11, the furnace main body 212 of the continuous heating furnace 200 includes an outer wall 212d and an inner wall 212e spaced apart from the outer wall 212d in the inner space of the furnace main body 212. The heat-retention layer 228 is constituted by a void between the outer wall 212d and the inner wall 212e. The exhaust gas discharged from the closed gas heater system 100 is guided to the void (the heat-retention layer 228) between the outer wall 212d and the inner wall 212e via a communication pipe 220e.

In the fourth embodiment, the same effect as the second embodiment can be obtained. In particular, according to the continuous heating furnace 200 according to the fourth embodiment, the exhaust gas is evenly spread to the entire wall surface of the furnace main body 212. For this reason, a decrease in temperature throughout the entire inside of the furnace main body 212 can be suppressed.

(Fifth Embodiment)

Next, a heat-retention board 226b according to a fifth embodiment will be described. In the fifth embodiment, a configuration of the heat-retention board 226b and the number of closed gas heater systems 100 are different from those of the first embodiment. Description of the same configuration as of the first embodiment will be omitted, and only the heat-retention board 226b and the number of closed gas heater systems 100 will be described.

Figure 12A:
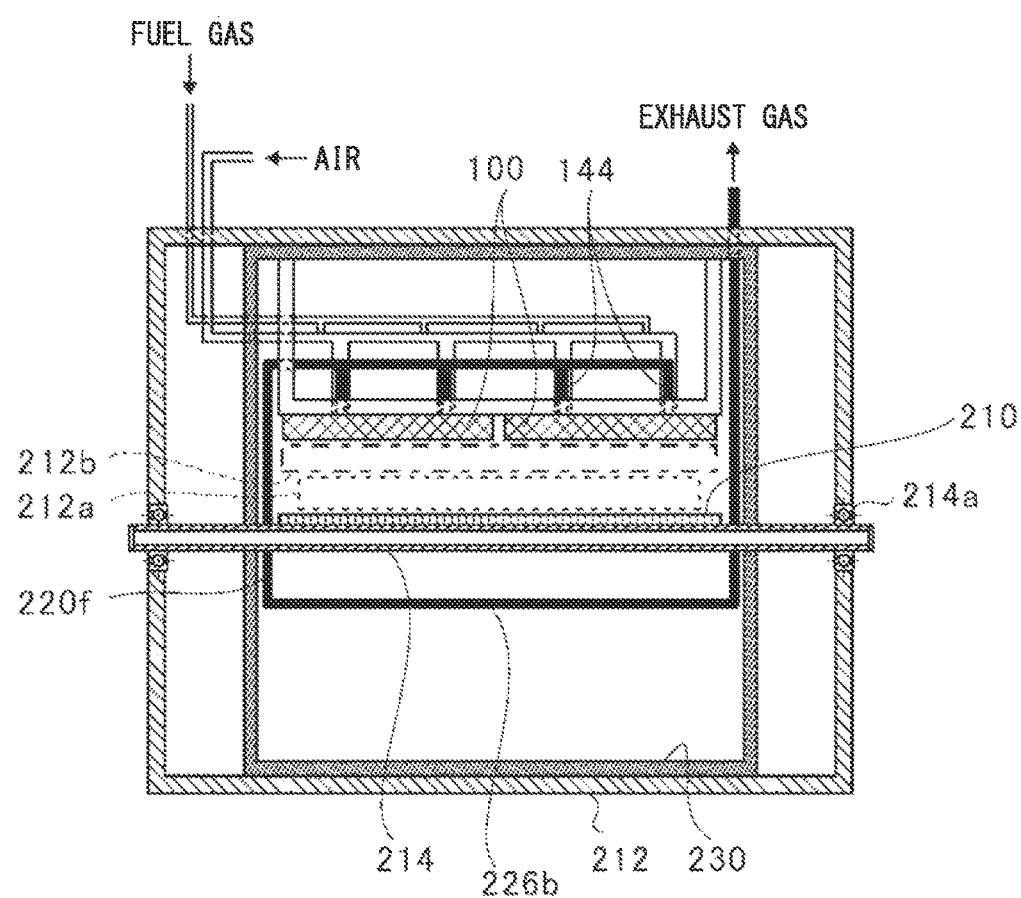
FIG. 12A is a view for describing a heat-retention board according to a fifth embodiment of the present invention.
Figure 12B:
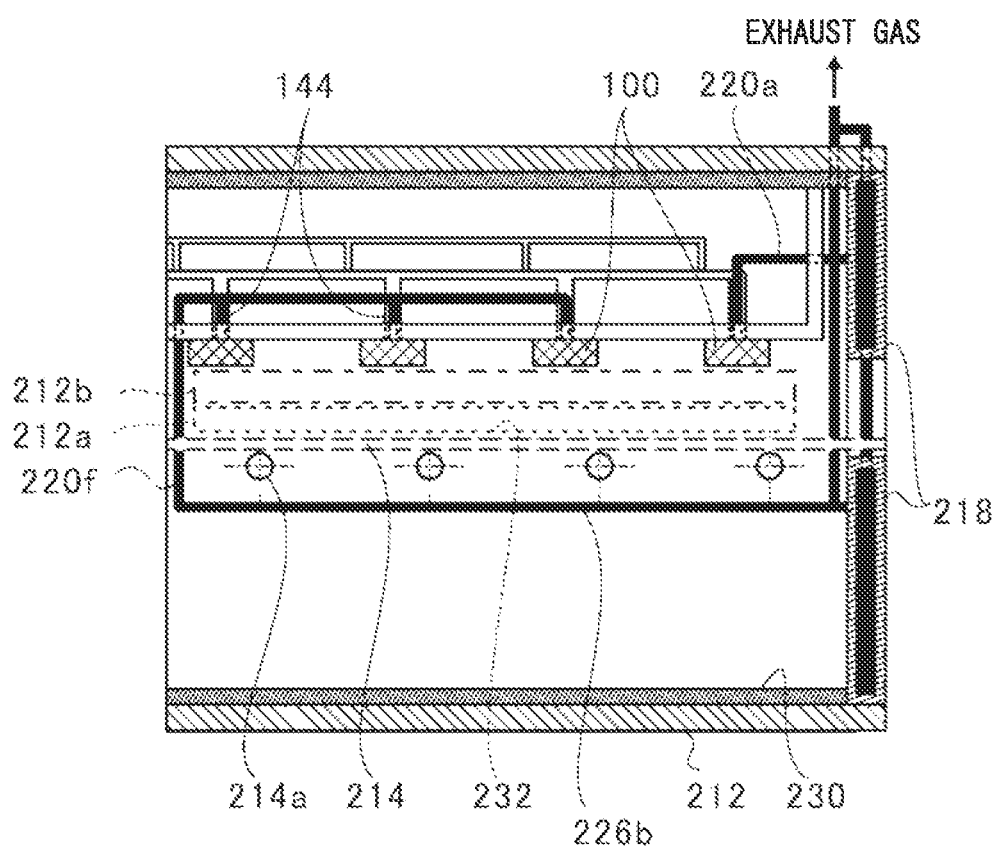
FIG. 12B is a view for describing the heat-retention board according to the fifth embodiment of the present invention.

FIGS. 12A and 12B are views for describing the heat-retention board 226b according to the fifth embodiment. FIG. 12A is a cross-sectional view of the same position as FIG. 7A, and FIG. 12B is an enlarged view of the same position as FIG. 7B.

In addition, while the communication pipe 220f goes around from a left side of the drawing of the target space 212a toward a lower side in the cross-section shown in FIG. 12A, in a cross-sectional view of another position, the communication pipe 220f goes around a right side of the target space 212a. As the communication pipe 220f goes around from the left and right sides of the target space 212a, temperature distribution in the horizontal direction of the target space 212a can be further uniformized.

In the above-mentioned first embodiment, the plurality of closed gas heater systems 100 are disposed to be opposite to each other to sandwich the target space 212a. In the fifth embodiment, the heat-retention board 226b is installed instead of the closed gas heater system 100 at a lower side in the vertical direction of the target space 212a. In addition, the number of closed gas heater systems 100 disposed in the furnace main body 212 is half that of the first embodiment. That is, as shown in FIGS. 12A and 12B, the heat-retention board 226b is disposed to be opposite to the closed gas heater system 100 to sandwich the target space 212a. The heat-retention board 226b is in communication with the second piping section 144 via the communication pipe 220f, and the exhaust gas is guided into a hollow inner space.

In the fifth embodiment, the same effect as of the second embodiment can be obtained. In particular, according to the continuous heating furnace 200 of the fifth embodiment, when the radiation heating is performed by only the closed gas heater system 100 from the upper surface side of the burning target, a decrease in temperature of the target space 212a of a lower surface side 232 (shown in FIG. 12B), which is not radiation-heated, can be suppressed.

The heat-retention wall, the heat-retention pipe, the heat-retention board and the heat-retention layer come in communication with the exhaust hole 142 of the closed gas heater 110 to form an exhaust heat transfer section into which the exhaust gas is guided. In addition, the exhaust heat transfer section such as the heat-retention wall, the heat-retention pipe, the heat-retention board, the heat-retention layer, and so on, is not limited to the above-mentioned position but may be installed at any portion in the furnace main body 212 except for the radiation space 212b.

In addition, in the above-mentioned embodiment, the combustion chamber 136 is not limited to the above-mentioned case in which the combustion chamber 136 is formed along the outer circumferential wall 122. The combustion chamber 136 may be disposed in a space surrounded by the outer circumferential wall 122, the heating plate 126 and the disposition plate 120. However, since a preheating effect of the fuel gas by the exhaust gas is sufficiently secured, for example, the combustion chamber 136 may be installed at any position of one of the space between the heating plate 126 and the partition plate 124 and the space between the partition plate 124 and the disposition plate 120, closer to the outer circumferential wall 122 than an intermediate position from the introduction hole 132 formed in the disposition plate 120 to the outer circumferential wall 122.

Hereinabove, while exemplary embodiments of the present invention have been described with reference to the accompanying drawings, the present invention is not limited to the above-mentioned embodiments. It will be appreciated to those skilled in the art that various changes and modifications may be made without departing from the scope of the accompanying claims and these will fall into the technical spirit of the present invention.

For example, in the above-mentioned embodiment, while the continuous heating furnace 200 is exemplified, for example, the present invention can also be applied to the heating furnace. In this case, like the continuous heating furnace 200, the exhaust heat transfer section is disposed at a portion in the furnace main body having a relatively low temperature, for example, in the vicinity of the wall surface. Accordingly, temperature distribution in the furnace main body of the heating furnace can be uniformized.

INDUSTRIAL APPLICABILITY

According to the heating furnace and the continuous heating furnace of the present invention, it is possible to provide the heating furnace and the continuous heating furnace that have uniform temperature distribution in the furnace main body without decreasing thermal efficiency.

DESCRIPTION OF REFERENCE SIGNS 110 closed gas heater
132 introduction hole
136 combustion chamber
138 discharge section
140 radiation surface
142 exhaust hole
200 continuous heating furnace (heating furnace)
210 conveyance body
212 furnace main body
212a target space
212b radiation space
212d outer wall
212e inner wall
212f void
218 heat-retention wall (exhaust heat transfer section)
222a, 222b, 222c heat-retention pipe (exhaust heat transfer section)
226a, 226b heat-retention board (exhaust heat transfer section)
228 heat-retention layer (exhaust heat transfer section)
230 insulating section

The invention claimed is:

1. A heating furnace comprising:
   a target space in which a target to be heated, which is conveyed in a conveyance direction, is disposed;
   a furnace main body that surrounds the target space;
   a plurality of closed gas heaters having an introduction hole configured to introduce a fuel gas into a heater main body, a combustion chamber in which the fuel gas introduced from the introduction hole is combusted, a discharge section configured to guide an exhaust gas generated by combustion in the combustion chamber, a radiation surface heated by the exhaust gas flowing through the discharge section or combustion in the combustion chamber and configured to transfer radiant heat to the target to be heated, and an exhaust hole configured to exhaust the exhaust gas that heats the radiation surface from the heater main body, and disposed in the furnace main body; and
   an exhaust heat transfer section in communication with the exhaust hole of the closed gas heater and to which only the exhaust gas is guided, the exhaust gas passing through the inside of the exhaust heat transfer section, and the exhaust heat transfer section is configured to warm the inside of the furnace main body using the exhaust heat of the exhaust gas passing through the inside of the exhaust heat transfer section,
   wherein:
   each of the plurality of closed gas heaters has a piping section which is fitted to the exhaust hole,
   the exhaust heat transfer section is installed at any portion within the furnace main body outside of the plurality of closed gas heaters, except for a radiation space, and includes a first heat-retention pipe extending in the conveyance direction of the target to be heated,
   the exhaust hole of the closed gas heater and the first heat-retention pipe are connected to each other via the piping section, whereby only the exhaust gas, which is exhausted from the closed gas heater, is guided to an inside of the first heat-retention pipe via the piping section, the exhaust heat transfer section further includes a heat-retention wall, the heat-retention wall is disposed at an end section in the conveyance direction of the furnace main body, extends perpendicularly to the conveyance direction with a gap for conveyance of the target to be heated, and has a hollow inner space through which the exhaust gas passes, the exhaust gas passing through the hollow inner space warming the inside of the furnace main body, the exhaust hole of the closed gas heater and the heat-retention wall are connected to each other via the piping section and a communication pipe, whereby only the exhaust gas, which is exhausted from the closed gas heater, is guided to the hollow inner space of the heat-retention wall via the piping section and the communication pipe, and the radiation space is formed between the closed gas heater and the target to be heated disposed in the target space and is configured to transfer the radiant heat to the target to be heated.

2. The heating furnace according to claim 1, wherein the plurality of closed gas heaters are disposed to be opposite to each other to sandwich the target space, the exhaust heat transfer section further includes a second heat-retention pipe and a third heat-retention pipe which are connected to the first heat-retention pipe, the second heat-retention pipe and the third heat-retention pipe extend in a direction perpendicular to the radiation surface of the closed gas heater, and are disposed opposite to each other on opposite sides of the target space, and the radiation space is formed to be surrounded by the plurality of closed gas heaters and the first heat-retention pipe, the second heat-retention pipe, and the third heat-retention pipe.

3. The heating furnace according to claim 1, wherein the exhaust heat transfer section is disposed to be opposite to the closed gas heater to sandwich the target space.

4. The heating furnace according to claim 1, further comprising an insulating section partially or entirely surrounding the radiation space and the exhaust heat transfer section and having thermal insulation.

5. The heating furnace according to claim 2, further comprising an insulating section partially or entirely surrounding the radiation space and the exhaust heat transfer section and having thermal insulation.

6. The heating furnace according to claim 3, further comprising an insulating section partially or entirely surrounding the radiation space and the exhaust heat transfer section and having thermal insulation.

7. The heating furnace according to claim 1, wherein the heat-retention wall is attached to the furnace main body and comprises:

an outer wall and an inner wall spaced apart from the outer wall in an inner space of the furnace main body; and wherein the hollow inner space, through which the exhaust gas passes, is disposed between the outer wall and the inner wall.

8. The heating furnace according to claim 2, wherein the heat-retention wall is attached to the furnace main body and comprises:

an outer wall and an inner wall spaced apart from the outer wall in an inner space of the furnace main body; and wherein the hollow inner space, through which the exhaust gas passes, is disposed between the outer wall and the inner wall.

9. The heating furnace according to claim 3, wherein the heat-retention wall is attached to the furnace main body and comprises:

an outer wall and an inner wall spaced apart from the outer wall in an inner space of the furnace main body; and wherein the hollow inner space, through which the exhaust gas passes, is disposed between the outer wall and the inner wall.

10. The heating furnace according to claim 4, wherein the heat-retention wall is attached to the furnace main body and comprises:

an outer wall and an inner wall spaced apart from the outer wall in an inner space of the furnace main body; and wherein the hollow inner space, through which the exhaust gas passes, is disposed between the outer wall and the inner wall.

11. The heating furnace according to claim 5, wherein the heat-retention wall is attached to the furnace main body and comprises:

an outer wall and an inner wall spaced apart from the outer wall in an inner space of the furnace main body; and wherein the hollow inner space, through which the exhaust gas passes, is disposed between the outer wall and the inner wall.

12. The heating furnace according to claim 6, wherein the heat-retention wall is attached to the furnace main body and comprises:

an outer wall and an inner wall spaced apart from the outer wall in an inner space of the furnace main body; and wherein the hollow inner space, through which the exhaust gas passes, is disposed between the outer wall and the inner wall.

13. A continuous heating furnace comprising:
the heating furnace according to claim 1; and
a conveyance body configured to convey the target to be heated in the furnace main body.

14. A continuous heating furnace comprising:
the heating furnace according to claim 2; and
a conveyance body configured to convey the target to be heated in the furnace main body.

15. A continuous heating furnace comprising:
the heating furnace according to claim 3; and
a conveyance body configured to convey the target to be heated in the furnace main body.

16. A continuous heating furnace comprising:
the heating furnace according to claim 4; and
a conveyance body configured to convey the target to be heated in the furnace main body.

17. A continuous heating furnace comprising:
the heating furnace according to claim 5; and
a conveyance body configured to convey the target to be heated in the furnace main body.

18. A continuous heating furnace comprising:
the heating furnace according to claim 6; and
a conveyance body configured to convey the target to be heated in the furnace main body.

19. A continuous heating furnace comprising:
the heating furnace according to claim 7; and
a conveyance body configured to convey the target to be heated in the furnace main body.

20. A continuous heating furnace comprising:
the heating furnace according to claim 8; and
a conveyance body configured to convey the target to be heated in the furnace main body.

21. A continuous heating furnace comprising:
the heating furnace according to claim 9; and
a conveyance body configured to convey the target to be heated in the furnace main body.

22. A continuous heating furnace comprising:
the heating furnace according to claim 10; and
a conveyance body configured to convey the target to be heated in the furnace main body.

23. A continuous heating furnace comprising:
the heating furnace according to claim 11; and
a conveyance body configured to convey the target to be heated in the furnace main body.

24. A continuous heating furnace comprising:
the heating furnace according to claim 12; and
a conveyance body configured to convey the target to be heated in the furnace main body.

25. A continuous heating furnace comprising:
a heating furnace comprising:
a target space in which a target to be heated, which is conveyed in a conveyance direction, is disposed,
a furnace main body that surrounds the target space,
one or more closed gas heaters having an introduction hole configured to introduce a fuel gas into a heater main body, a combustion chamber in which the fuel gas introduced from the introduction hole is combusted, a discharge section configured to guide an exhaust gas generated by combustion in the combustion chamber, a radiation surface heated by the exhaust gas flowing through the discharge section or combustion in the combustion chamber and configured to transfer radiant heat to the target to be heated, and an exhaust hole configured to exhaust the exhaust gas that heats the radiation surface from the heater main body, and disposed in the furnace main body, and
an exhaust heat transfer section in communication with the exhaust hole of the closed gas heater and to which only the exhaust gas is guided,
wherein:
the exhaust heat transfer section is installed at any portion within the furnace main body outside of the one or more closed gas heaters, except for a radiation space, and includes a first heat-retention pipe extending in the conveyance direction of the target to be heated, and
the radiation space is formed between the closed gas heater and the target to be heated disposed in the target space and is configured to transfer the radiant heat to the target to be heated, and
the continuous heating furnace further comprises:
a conveyance body configured to convey the target to be heated in the furnace main body, and
a roller which is hollow and supports a portion of the conveyance body,
wherein the roller is in communication with the exhaust hole of the closed gas heater so that the exhaust gas is guided to the roller and flows through an inside of the roller.

* * * * *